Nov. 21, 1967 J. LOUTTE 3,353,943
APPARATUS FOR THE MANUFACTURE OF SHEET GLASS ON A MOLTEN BATH
Filed Sept. 9, 1963 2 Sheets-Sheet 1
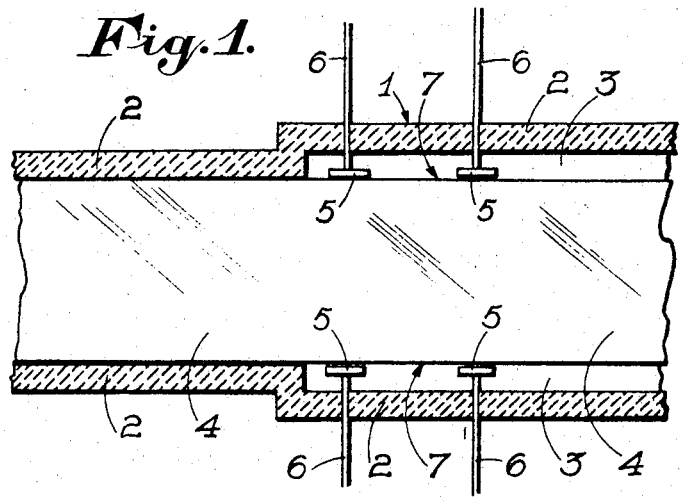
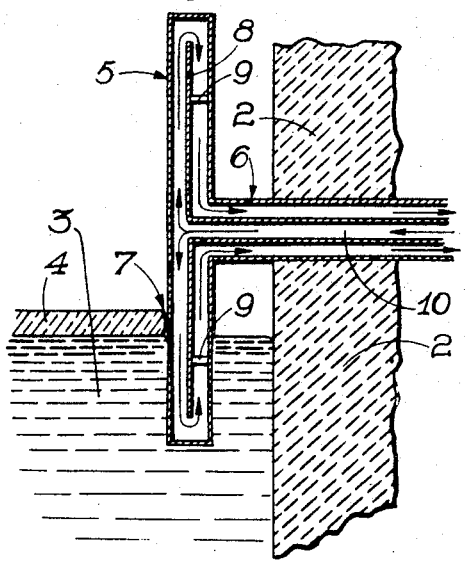
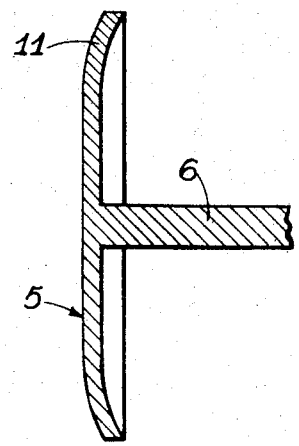
INVENTOR
JEAN LOUTTE
BY
Corey, Hart + Stemple
ATTORNEYS INVENTOR
JEAN LOUTTE
BY Corey, Hart & Stemple
ATTORNEYS

# United States Patent Office 3,353,943
Patented Nov. 21, 1967

3,353,943
APPARATUS FOR THE MANUFACTURE OF SHEET GLASS ON A MOLTEN BATH
Jean Loutte, Gouy-lez-Pieton, Belgium, assignor to Glaverbel, Watermael-Boitsfort, Belgium, a Belgian company
Filed Sept. 9, 1963, Ser. No. 307,461
Claims priority, application Luxembourg, Sept. 29, 1962, 42,442
13 Claims. (Cl. 65—182)

The present invention relates to an apparatus for the manufacture of sheet glass by floating of the glass on a bath of molten metal or salts.

In some processes for the manufacture of sheet glass by floating, the glass is deposited on a bath of molten metal or salts at a high temperature which ensures sufficient fluidity of the glass for it to spread in the form of a sheet on the surface of the bath.

In other processes, the glass is first brought into the form of a plastic ribbon, which is thereafter deposited on the surface of the bath, on which it is carried into a zone in which it is heated to a temperature at least equal to the temperature at which melting commences.

It will be seen that regardless of the process employed the glass deposited on the surface of the molten metal or salt bath reaches a temperature at which it is capable of, whether it is formed by casting or by deposition of a plastic ribbon which is thereafter heated, is largely conditioned by the extent to which it spreads. This spreading is itself determined mainly by the wetting power of the molten metal or salt bath.

If it is desired to obtain a glass sheet which has a predetermined regular thickness, it is therefore essential to maintain the glass sheet at a fixed uniform width.

The present invention makes it possible to maintain the glass sheet at a constant width which is smaller than that of the subjacent bath. The thickness of the sheet is not, therefore, related solely to the extent to which the glass spreads and it is not likely to be modified in the course of the travel of the glass ribbon, more especially through the zones in which the latter is heated. In addition, it makes it possible to accelerate the solidification of the edges of the ribbon, so that the latter contribute to the maintenance of the uniformity of the width of the latter throughout its subsequent travel through the compartment until the sheet is completely solidified.

The apparatus according to the invention comprises in the neighbourhood of each of the longitudinal walls of the compartment at least one substantially vertical disc which is partially immersed in the bath of molten material and is capable of rotating about its axis in a plane parallel to the edge of the glass ribbon.

The glass ribbon therefore extends between the disc or discs in the neighbourhood of one wall, on the one hand, and the disc or discs in the neighbourhood of the other wall, on the other hand, and its width is thus limited by these discs, along the surface of which its edges travel.

The discs are made of metal or of a material which does not adhere to the hot glass, for example boron nitride. If metal discs are employed, these are advantageously cooled, for example by circulation of a fluid, in order to prevent them from adhering to the hot glass. In addition, this cooling has the advantage of accelerating the solidification of the edges.

In order that the edges of the ribbon which tend to stretch may not be damaged by the edge of the discs, it is advantageous to give the surface of the said discs in contact with the glass a convex form, at least along its periphery.

In another embodiment, the disc is provided with a knurled roller for driving the edge of the ribbon. The said roller, which is keyed on the shaft of the disc, may be conical, so as to form with the latter an acute angle enclosing the edge of the glass ribbon against the bath of molten material. The shaft may be driven with a rotational movement, for example by means of a motor comprising a variable-speed gear. The discs may be mounted loose on their shaft, but it is preferable to key them thereon. Their forced rotation thus reduced the braking of the edges against their surface of contact.

FIGURES 1 to 7 illustrate by way of example a number of embodiments of the invention.

FIGURE 1 is a plan view of a working compartment provided with the apparatus according to the invention.

FIGURE 2 is a section through a disc according to the invention.

FIGURE 3 illustrates a variant in the form of the disc.

FIGURE 4 is a plan view of a working compartment provided with discs provided with knurled rollers.

FIGURE 5 is a front view of the apparatus of FIGURE 4.

FIGURE 6 is a section along the line VI—VI of FIGURE 5.

FIGURES 7 and 8 show two modified forms of discs provided with knurled rollers.

Figure 4:
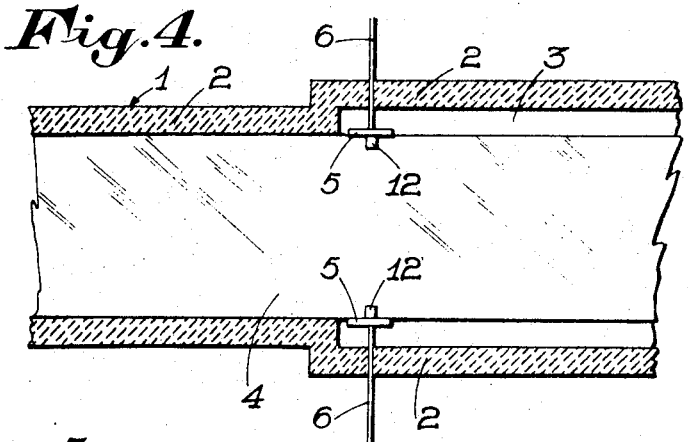

FIGURES 1 and 2 illustrate an application of the invention to a compartment 1 formed of the walls 2 and containing a bath of molten material 3 on which there slides a ribbon of plastic glass 4. Metallic discs 5 keyed on shafts 6 by which they are driven are disposed against the edges 7 of the ribbon 4. The metallic discs are advantageously cooled by a circulation of water (FIGURE 2). The disc 5 and its shaft 6 are hollow. A circular plate 8, of which the diameter is smaller than that of the disc 5, is fixed within the latter by stays 9. The plate 8 is fast with a tube 10 concentric with the shaft 6. The water, which is introduced through the tube 10, is discharged through the cavity in the shaft 6 after having travelled through the disc along the path indicated by arrows.

The cooling of the disc has the object of preventing it from adhering to the glass at certain temperatures. In addition, it accelerates the solidification of the edges of the ribbon, whereby their rigidity is improved.

Instead of metal, it is obviously possible to use for the discs a material which does not adhere to the hot glass, for example boron nitride.

In order that the edges of the glass ribbon, which tend to stretch, may not be damaged by the edge of the discs, the latter are advantageously given the form of a mushroom 11 in the neighbourhood of their periphery, as illustrated in FIGURE 3.

Figure 5:
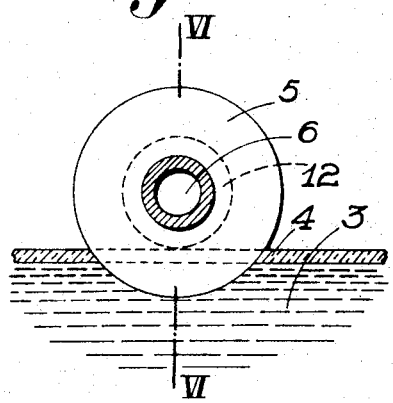
Figure 6:
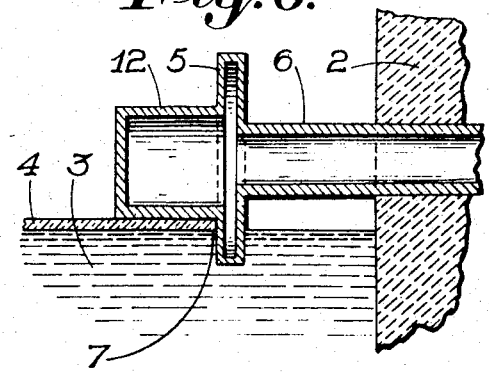

In other embodiments, as illustrated in FIGURES 4 to 6, the discs are provided with knurled rollers 12 which drive the edges of the glass ribbon 4. This knurled roller is in the form of a cylinder whose diameter is smaller than that of the disc 5 and which is fast with the latter. It mantains the edge 7 of the glass ribbon 4 against the bath of molten material 3 over which it drives it, while the partly immersed disc limits the width of the ribbon 4. Means may advantageously be provided to cool the disc and the knurled roller.

Figure 7:
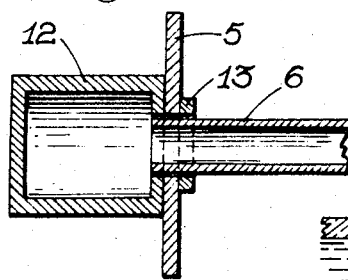

FIGURE 7 illustrates a variant which consists in securing the knurled roller 12 to the end of the shaft 6 and locating the disc 5 against said roller by means of a nut 13. This arrangement is particularly advantageous when a disc consisting of boron nitride, for example, is employed.

Figure 8:
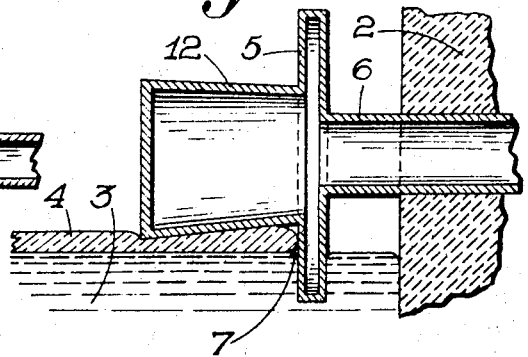

Finally, FIGURE 8 illustrates a variant in which the knurled roller is of conical form so as to squeeze the edge 7 of the ribbon 4 lightly against the bath 3.

Of course, the invention is not limited to the embodiments illustrated by way of example and modifications may be made thereto without departing from its scope.

I claim:

1. Apparatus for the manufacture of sheet glass, comprising a compartment containing a bath of molten material on which slides a ribbon of glass and having side walls spaced apart a distance greater than the width of the glass ribbon, a substantially vertically disposed disc arranged in substantial parallelism adjacently to each side wall and having an inner vertically disposed, ribbon engageable face located between its associated side wall and one side edge of the glass ribbon, said discs being constructed of such material that the ribbon engageable faces thereof do not stick to the hot glass in the side edges of the ribbon, and such faces having plane substantially smooth surfaces of large ribbon edge contacting area, and means associated with said side walls for supporting said disc for rotational movement in planes parallel to the side edges of the glass ribbon and partially immersed in the bath of molten material, so that said inner faces of such discs are engageable by the side edges of the glass ribbon and control the width of the glass ribbon without adhering to the hot glass in the side edges thereof.

2. Apparatus as defined in claim 1, in which said disc supporting means supports said discs for rotational movement about horizontal axes perpendicular to the side edges of the glass ribbon.

3. Apparatus as defined in claim 2, in which said disc supporting means comprises a horizontal shaft for each disc projecting inwardly from a side wall of the compartment and located above the bath of molten material.

4. Apparatus as defined in claim 3, in which each disc is loosely mounted on its associated shaft.

5. Apparatus as defined in claim 4, in which each disc is secured to its associated shaft, and in which said shafts are driven shafts and rotate said discs in the direction of travel of the glass ribbon.

6. Apparatus as defined in claim 1, in which said discs are constituted of metal material, and conduit means for circulating cooling fluid within said discs to prevent the metal material thereof adhering to the hot glass in the sides of the ribbon.

7. Apparatus as defined in claim 1, in which said discs are constituted of a material that does not stick to glass.

8. Apparatus as defined in claim 7, in which said discs are constituted of boron nitride.

9. Apparatus as defined in claim 1, in which said discs are configured so that the peripheries thereof are retracted with relation to the ribbon engageable portions of the inner faces thereof.

10. Apparatus for the manufacture of sheet glass, comprising a compartment containing a bath of molten material on which slides a ribbon of glass and having side walls spaced apart a distance greater than the width of the glass ribbon, a plurality of substantially vertically disposed discs having inner, vertically disposed, ribbon engageable faces located between said side walls and the side edges of the glass ribbon, and means associated with said side walls for supporting said discs for rotational movement in planes parallel to the side edges of the glass ribbon and partially immersed in the bath of molten material, so that the inner faces of such discs are engageable by the side edges of the glass ribbon and control the width of the glass ribbon, a roller connected to each of said discs and having a rotational axis common with the rotational axis of its associated disc, said roller having a diameter less than that of said disc, and projecting inwardly from the inner face of said disc so as to overlie and engage a side edge portion of the glass ribbon.

11. Apparatus as defined in claim 10, in which the peripheral surfaces of said rollers are knurled.

12. Apparatus as defined in claim 11, in which said rollers are frusto conically shaped and have their ends of smaller diameter adjacent to said inner faces of the discs so that the peripheral surfaces of said rollers form acute angles with said inner face.

13. Apparatus as defined in claim 1, including a plurality of said discs disposed in aligned, spaced relation on each side of the glass ribbon, the discs on each side of the ribbon being each paired with a disc on the other side of the ribbon with the ribbon engageable faces of each pair of discs disposed in opposed relation.

References Cited

UNITED STATES PATENTS

| | | | |
|---|---|---|---|
| 2,298,348 | 10/1942 | Coxe | 65—182 X |
| 3,083,551 | 4/1963 | Pilkington | 65—65 X |
| 3,223,503 | 12/1965 | Barradell-Smith et al. | 65—65 X |

DONALL H. SYLVESTER, *Primary Examiner.*

A. D. KELLOGG, *Assistant Examiner.*